(12) United States Patent
Hu

(10) Patent No.: US 6,865,905 B2
(45) Date of Patent: Mar. 15, 2005

(54) REFRIGERATOR METHODS AND APPARATUS

(75) Inventor: Ziqiang Hu, Prospect, KY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/249,037

(22) Filed: Mar. 11, 2003

(65) Prior Publication Data

US 2004/0177637 A1 Sep. 16, 2004

(51) Int. Cl.[7] .............................................. F25D 17/04
(52) U.S. Cl. ........................................ 62/407; 62/441
(58) Field of Search ...................... 62/506, 503, 509, 62/513, 407, 408, 441, 443, 258

(56) References Cited

U.S. PATENT DOCUMENTS

| 3,638,717 A | * | 2/1972 | Harbour | 165/30 |
|---|---|---|---|---|
| 5,477,699 A | | 12/1995 | Guess et al. | |
| 5,704,224 A | * | 1/1998 | Choi | 62/407 |
| 5,758,512 A | * | 6/1998 | Peterson et al. | 62/407 |
| 5,878,592 A | | 3/1999 | Borges et al. | |
| 5,921,104 A | * | 7/1999 | Chang | 62/407 |
| 6,023,939 A | | 2/2000 | Correa | |
| 6,062,037 A | * | 5/2000 | Yoon | 62/407 |
| 6,330,810 B1 | * | 12/2001 | Yamazaki et al. | 62/509 |
| 6,494,059 B2 | * | 12/2002 | Yamazaki et al. | 62/509 |
| 6,560,980 B2 | | 5/2003 | Gustafson et al. | |
| 6,622,503 B1 | | 9/2003 | Bennett et al. | |

* cited by examiner

Primary Examiner—Melvin Jones
(74) Attorney, Agent, or Firm—George L. Rideout, Jr.; Armstrong Teasdale LLP

(57) ABSTRACT

A refrigerator includes a plurality of walls forming a refrigeration compartment, an evaporator is positioned proximate at least one of the walls, a thermal insulator is positioned proximate the evaporator, and an airflow duct is positioned proximate the thermal insulator such that the thermal insulator is between the evaporator and the airflow duct.

18 Claims, 3 Drawing Sheets

REFRIGERATOR METHODS AND APPARATUS

BACKGROUND OF INVENTION

This invention relates generally to refrigerators, and more particularly, to refrigerators with an evaporator in a fresh food compartment.

Some known refrigerators include a fresh food compartment and a freezer compartment. Such a refrigerator also typically includes a refrigeration sealed system circuit including a compressor, an evaporator, and a condenser connected in series. An evaporator fan is provided to blow air over the evaporator, and a condenser fan is provided to blow air over the condenser.

In operation, when an upper temperature limit is reached in the freezer compartment, the compressor, evaporator fan, and condenser fan are energized. Once the temperature in the freezer compartment reaches a lower temperature limit, the compressor, evaporator fan, and condenser fan are de-energized.

Some known refrigerators typically regulate a temperature of a fresh food compartment by opening and closing a damper established in flow communication with a freezer compartment, and by operating a fan to draw cold freezer compartment air into the fresh food compartment as needed to maintain a desired temperature in the fresh food compartment. At least one refrigerator includes an evaporator in the fresh food compartment. However, there is typically a relatively large temperature difference between a fresh food compartment and a fresh food evaporator, and this difference may cause sweat and ice problems.

SUMMARY OF INVENTION

In one aspect, a refrigerator includes a plurality of walls forming a refrigeration compartment, an evaporator is positioned proximate at least one of the walls, a thermal insulator is positioned proximate the evaporator, and an airflow duct is positioned proximate the thermal insulator such that the thermal insulator is between the evaporator and the airflow duct.

In another aspect, a method for assembling a refrigerator is provided. The method includes providing a plurality of walls forming a refrigeration compartment, positioning an evaporator proximate at least one of the walls, positioning a thermal insulator proximate the evaporator, and positioning an airflow duct proximate the insulator such that the insulator is between the airflow duct and the evaporator.

DETAILED DESCRIPTION

Figure 1:
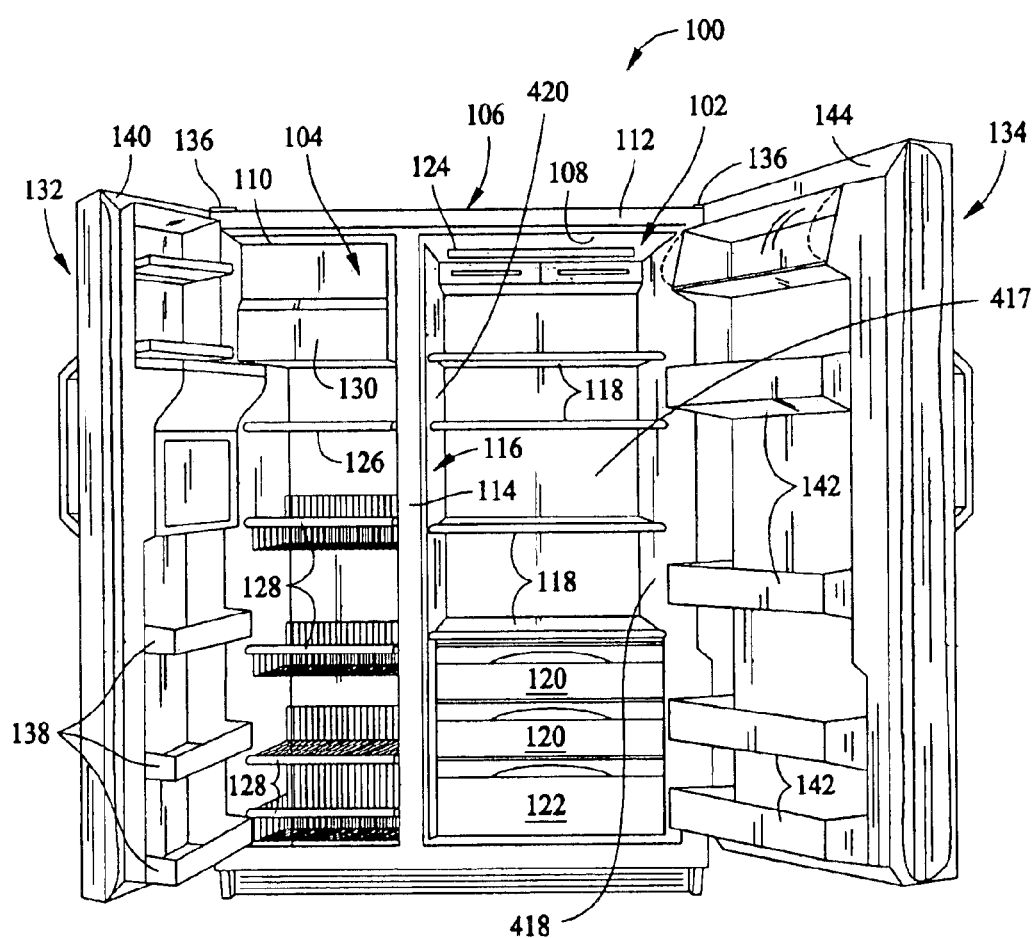
FIG. 1 is a perspective view of a refrigerator.

FIG. 1 illustrates a side-by-side refrigerator 100 including a fresh food storage compartment 102 and freezer storage compartment 104. Freezer compartment 104 and fresh food compartment 102 are arranged side-by-side. In one embodiment, refrigerator 100 is a commercially available refrigerator from General Electric Company, Appliance Park, Louisville, Ky. 40225, and modified as herein described.

It is contemplated, however, that the teaching of the description set forth below is applicable to other types of refrigeration appliances, including but not limited to top and bottom mount refrigerators wherein evaporator insulator systems may also exist. The present invention is therefore not intended to be limited to be limited to any particular type or configuration of a refrigerator, such as refrigerator 100.

Refrigerator 100 includes a fresh food storage compartment 102 and a freezer storage compartment 104 contained within an outer case 106 and inner liners 108 and 110. A space between case 106 and liners 108 and 110, and between liners 108 and 110, is filled with foamed-in-place insulation. Outer case 106 normally is formed by folding a sheet of a suitable material, such as pre-painted steel, into an inverted U-shape to form top and side walls of case. A bottom wall of case 106 normally is formed separately and attached to the case side walls and to a bottom frame that provides support for refrigerator 100. Inner liners 108 and 110 are molded from a suitable plastic material to form freezer compartment 104 and fresh food compartment 102, respectively. Alternatively, liners 108, 110 may be formed by bending and welding a sheet of a suitable metal, such as steel. The illustrative embodiment includes two separate liners 108, 110 as it is a relatively large capacity unit and separate liners add strength and are easier to maintain within manufacturing tolerances. In smaller refrigerators, a single liner is formed and a mullion spans between opposite sides of the liner to divide it into a freezer compartment and a fresh food compartment.

A breaker strip 112 extends between a case front flange and outer front edges of liners. Breaker strip 112 is formed from a suitable resilient material, such as an extruded acrylo-butadiene-styrene based material (commonly referred to as ABS).

The insulation in the space between liners 108, 110 is covered by another strip of suitable resilient material, which also commonly is referred to as a mullion 114. Mullion 114 also preferably is formed of an extruded ABS material. Breaker strip 112 and mullion 114 form a front face, and extend completely around inner peripheral edges of case 106 and vertically between liners 108, 110. Mullion 114, insulation between compartments, and a spaced wall of liners separating compartments, sometimes are collectively referred to herein as a center mullion wall 116.

Shelves 118 and slide-out drawers 120 normally are provided in fresh food compartment 102 to support items being stored therein. A bottom drawer or pan 122 partly forms a quick chill and thaw system (not shown) and selectively controlled, together with other refrigerator features, by a microprocessor (not shown) according to user preference via manipulation of a control interface 124 mounted in an upper region of fresh food storage compartment 102 and coupled to the microprocessor. A shelf 126 and wire baskets 128 are also provided in freezer compartment 104. In addition, an ice maker 130 may be provided in freezer compartment 104.

A freezer door 132 and a fresh food door 134 close access openings to fresh food and freezer compartments 102, 104, respectively. Each door 132, 134 is mounted by a top hinge 136 and a bottom hinge (not shown) to rotate about its outer vertical edge between an open position, as shown in FIG. 1, and a closed position (not shown) closing the associated storage compartment. Freezer door 132 includes a plurality of storage shelves 138 and a sealing gasket 140, and fresh food door 134 also includes a plurality of storage shelves 142 and a sealing gasket 144.

In accordance with known refrigerators, refrigerator 100 also includes a machinery compartment (not shown) that at least partially contains components for executing a known vapor compression cycle for cooling air. The components include a compressor (not shown in FIG. 1), a condenser (not shown), an expansion device (not shown), and an evaporator (not shown in FIG. 1) connected in series and charged with a refrigerant. The evaporator is a type of heat exchanger which transfers heat from air passing over the evaporator to a refrigerant flowing through the evaporator, thereby causing the refrigerant to vaporize. The cooled air is used to refrigerate one or more refrigerator or freezer compartments via fans (not shown). Collectively, the vapor compression cycle components in a refrigeration circuit, associated fans, and associated compartments are referred to herein as a sealed system.

Figure 2:
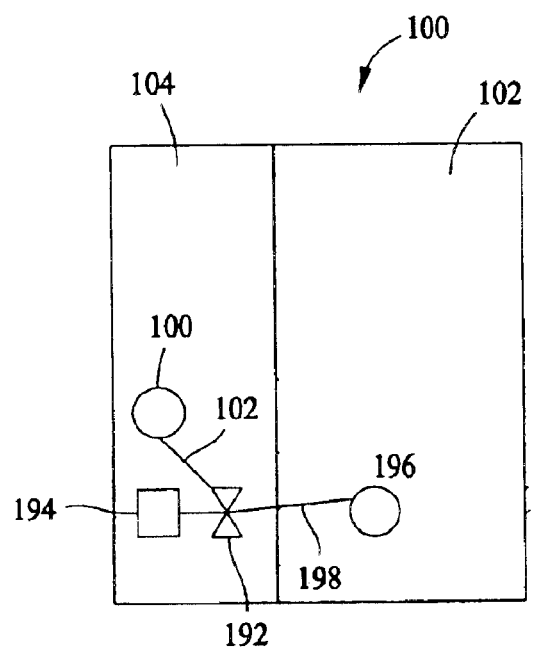
FIG. 2 is a schematic illustration of the exemplary refrigerator.

FIG. 2 is schematic illustration of refrigerator 100. During operation refrigerator 100, a three-way valve 192 is utilized to switch refrigerant flow from one evaporator to another depending on the temperatures in fresh food and freezer compartments 102 and 104. A compressor 194 delivers refrigerant to a fresh food evaporator 196 via a path to fresh food evaporator 198 and to freezer evaporator 200 via a path to freezer evaporator 202. Three-way valve 192 has at least a first outlet (not shown) coupled to path to fresh food evaporator 198 and a second outlet coupled to path to freezer evaporator 202.

Figure 3:
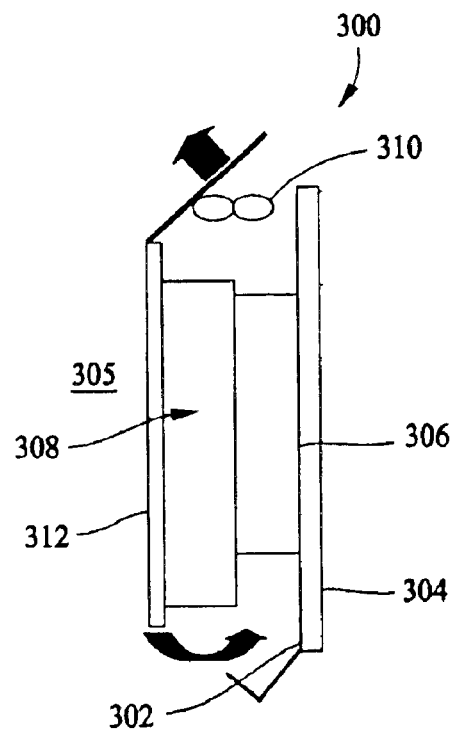
FIG. 3 illustrates a known evaporator insulating system.

FIG. 3 illustrates a known evaporator insulating system 300 including an inner surface 302 of a fresh food compartment wall 304 of a fresh food compartment 305. An evaporator 306 is positioned adjacent inner surface 302 and extends to a thermal insulator 308. A fan 310 is positioned to draw air through evaporator 306. An evaporator cover 312 is mounted to insulator 308 and extends above fan 310 shielding fan 310, insulator 308, and evaporator 306 from view. Insulating system 300 facilitates reducing or eliminating sweat and ice problems due to a relatively large temperature difference between evaporator 306 and fresh food compartment 305. However, thermal insulator 308 is typically about one inch thick and reduces the usable volume of fresh food compartment 305 accordingly.

Figure 4:
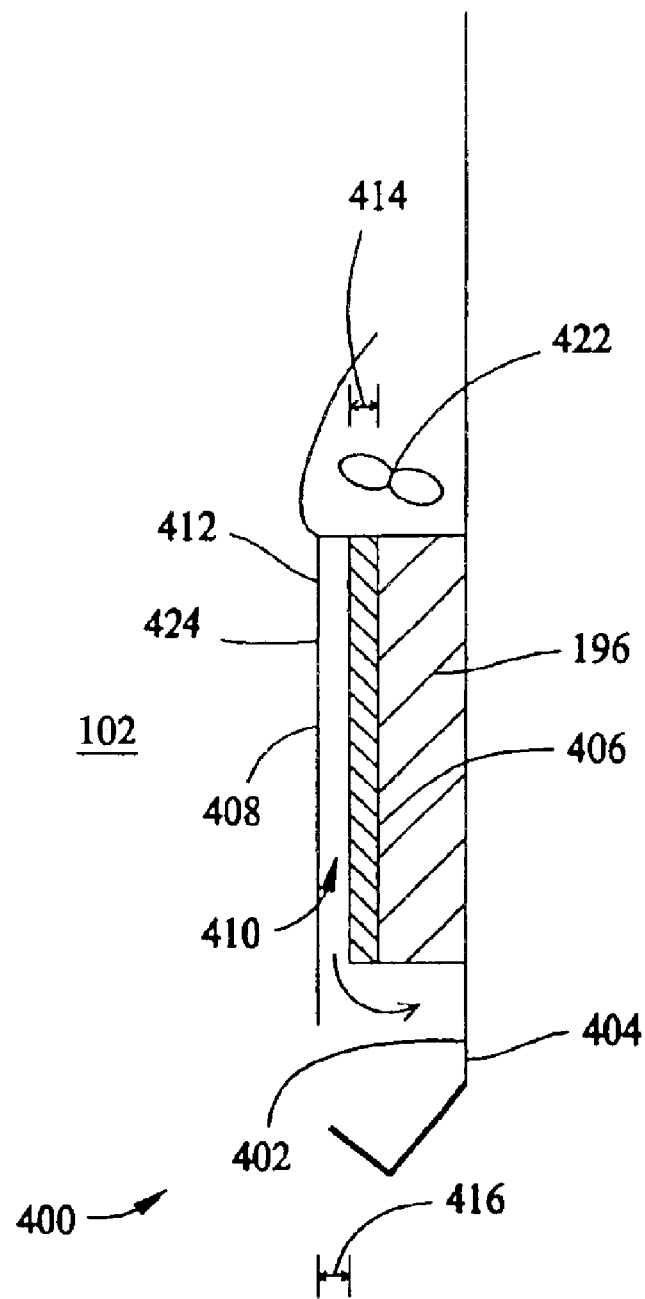
FIG. 4 illustrates an evaporator insulating system.

FIG. 4 illustrates an evaporator insulating system 400 which reduces a useable volume of a fresh food compartment less then system 300. System 400 includes an inner surface 402 of a fresh food compartment wall 404 of fresh food compartment 102. Evaporator 196 is positioned proximate wall 404 and extends to a thermal insulator 406. An evaporator cover 408 is distanced from thermal insulator 406 forming an airflow duct 410. Cover 408 includes a plurality of louvers (not shown) that allow air from within compartment 102 to pass through cover at a top portion 412 of cover 408. In one embodiment, instead of louvers, cover 408 includes a plurality of openings (not shown) allowing air to pass therethrough. Insulator 406 has a thickness 414 which in one embodiment is less than about one half inch. Alternatively, thickness 414 is less than about one quarter inch. Airflow duct 410 has a thickness 416 which in one embodiment is less than about one half inch. Alternatively, thickness 416 is less than about one quarter inch. In an exemplary embodiment, wall 404 is a back wall 417 (shown in FIG. 1). In another embodiment, wall 404 is a side wall such as a side wall 418 opposite mullion 114 or a side wall 420 adjacent mullion 114 (shown in FIG. 1). A fan 422 is positioned to draw air through evaporator 196 to cool fresh food compartment 102. Evaporator cover 408 includes an outer surface 424.

In use, air from refrigeration compartment 102 is drawn into airflow duct 410 and facilitates raising the temperature of thermal insulator 406 to a temperature higher than insulator 406 would be at without airflow duct 410 being present. In addition, the air passing through air duct 410 at least partially removes any moisture condensed on outer surface 424 and make outer surface 424 warmer. Accordingly, less condensed water and less ice buildup on outer surface 424 is facilitated. Additionally, the combined thickness of airflow duct 410 and insulator 406 is less than the thickness of thermal insulator 308, which allows for increased useable volume in a fresh food compartment such as fresh food compartment 102.

Exemplary embodiments of refrigerator systems are described above in detail. The systems are not limited to the specific embodiments described herein, but rather, components of each assembly may be utilized independently and separately from other components described herein. Each refrigerator component can also be used in combination with other refrigerator and evaporator components.

While the invention has been described in terms of various specific embodiments, those skilled in the art will recognize that the invention can be practiced with modification within the spirit and scope of the claims.

What is claimed is:

1. A refrigerator comprising:
   a plurality of walls forming a refrigeration compartment;
   an evaporator positioned proximate at least one of said walls;
   a thermal insulator positioned proximate said evaporator; and
   an airflow duct positioned proximate said thermal insulator such that said thermal insulator is between said evaporator and said airflow duct, wherein said insulator comprises a thickness less than about one half inch.

2. A refrigerator according to claim 1, wherein said insulator comprises a thickness less than about one quarter inch.

3. A refrigerator according to claim 1, wherein one of said plurality of walls comprises a back wall, said evaporator positioned proximate said back wall.

4. A refrigerator comprising:
   a plurality of walls forming a refrigeration compartment;
   an evaporator positioned proximate at least one of said walls;
   a thermal insulator positioned proximate said evaporator; and
   an airflow duct positioned proximate said thermal insulator such that said thermal insulator is between said evaporator and said airflow duct, wherein said airflow duct comprises a thickness less than about one half inch.

5. A refrigerator according to claim 4, wherein said airflow duct comprises a thickness less than about one quarter inch.

6. A refrigerator according to claim 4, wherein said insulator comprises a thickness less than about one half inch.

7. A refrigerator according to claim 4, wherein said insulator comprises a thickness less than about one quarter inch.

8. A refrigerator according to claim 5, wherein said insulator comprises a thickness less than about one half inch.

9. A refrigerator according to claim 5, wherein said insulator comprises a thickness less than about one quarter inch.

10. A method for assembling a refrigerator, said method comprising:

providing a plurality of walls forming a refrigeration compartment;

positioning an evaporator proximate at least one of the walls;

positioning a thermal insulator proximate the evaporator; and positioning an airflow duct proximate the insulator such that the insulator is between the airflow duct and the evaporator, wherein said positioning a thermal insulator comprises positioning a thermal insulator proximate the evaporator, wherein the insulator comprises a thickness less than about one half inch.

11. A method in accordance with claim 10, wherein said positioning a thermal insulator comprises positioning a thermal insulator proximate the evaporator, wherein the insulator comprises a thickness less than about one quarter inch.

12. A method in accordance with claim 10, wherein said providing a plurality of walls comprises providing a back wall, said positioning an evaporator comprises positioning an evaporator proximate the back wall.

13. A method for assembling a refrigerator, said method comprising:

providing a plurality of walls forming a refrigeration compartment;

positioning an evaporator proximate at least one of the walls;

positioning a thermal insulator proximate the evaporator; and positioning an airflow duct proximate the insulator such that the insulator is between the airflow duct and the evaporator, wherein said positioning an airflow duct comprises positioning an airflow duct proximate the insulator, wherein the airflow duct comprises a thickness less than about one half inch.

14. A method for assembling a refrigerator, said method comprising:

providing a plurality of walls forming a refrigeration compartment;

positioning an evaporator proximate at least one of the walls;

positioning a thermal insulator proximate the evaporator; and positioning an airflow duct proximate the insulator such that the insulator is between the airflow duct and the evaporator, wherein said positioning an airflow duct comprises positioning an airflow duct proximate the insulator, wherein the airflow duct comprises a thickness less than about one quarter inch.

15. A method in accordance with claim 13, wherein said positioning a thermal insulator comprises positioning a thermal insulator proximate the evaporator, wherein the insulator comprises a thickness less than about one half inch.

16. A method in accordance with claim 13, wherein said positioning a thermal insulator comprises positioning a thermal insulator proximate the evaporator, wherein the insulator comprises a thickness less than about one quarter inch.

17. A method in accordance with claim 14, wherein said positioning a thermal insulator comprises positioning a thermal insulator proximate the evaporator, wherein the insulator comprises a thickness less than about one half inch.

18. A method in accordance with claim 14, wherein said positioning a thermal insulator comprises positioning a thermal insulator proximate the evaporator, wherein the insulator comprises a thickness less than about one quarter inch.

* * * * *